J. A. MOORE.
MACHINE FOR CREASING BLANKS.
APPLICATION FILED JULY 21, 1917.

1,286,714.

Patented Dec. 3, 1918.
12 SHEETS—SHEET 3.

Inventor:
John Augustus Moore
by Dodge and Sons
Attorney

J. A. MOORE.
MACHINE FOR CREASING BLANKS.
APPLICATION FILED JULY 21, 1917.

1,286,714.

Patented Dec. 3, 1918.
12 SHEETS—SHEET 7.

Inventor:
John Augustus Moore,
By Dodge and Sons,
Attorneys

J. A. MOORE.
MACHINE FOR CREASING BLANKS.
APPLICATION FILED JULY 21, 1917.

1,286,714.

Patented Dec. 3, 1918.
12 SHEETS—SHEET 10.

Inventor:
John Augustus Moore,
By Dodge and Sons
Attorneys

UNITED STATES PATENT OFFICE.

JOHN AUGUSTUS MOORE, OF LOUISVILLE, KENTUCKY, ASSIGNOR TO MENGEL BOX COMPANY, OF LOUISVILLE, KENTUCKY, A CORPORATION OF NEW JERSEY.

MACHINE FOR CREASING BLANKS.

1,286,714.  Specification of Letters Patent.  Patented Dec. 3, 1918.

Application filed July 21, 1917. Serial No. 182,077.

*To all whom it may concern:*

Be it known that I, JOHN AUGUSTUS MOORE, a citizen of the United States, residing at Louisville, in the county of Jefferson and State of Kentucky, have invented certain new and useful Improvements in Machines for Creasing Blanks, of which the following is a specification.

My present invention pertains to an improved machine for creasing or indenting blanks and more particularly to a machine designed especially for creasing box blanks formed up from paper, corrugated paper board and the like.

Boxes or cartons formed from paper board and more particularly corrugated paper board have come into quite extensive use, and the present structure is designed to indent or crease the blanks from which the boxes or cartons are produced so that the blanks may be readily brought to accurate form.

One embodiment of the invention is illustrated in the annexed drawings wherein.

In a broad sense, the machine may be said to comprise a continuously operating feed mechanism for the blanks, stop devices for arresting the blank at given or predetermined points in its travel, an indenter adapted to work in timed relation with the stops to form cross creases or indented lines on the blank and other indenters adapted as the blanks are fed along to produce creases at right angles to the first named creases.

Referring first to the construction disclosed in Figs. 1 to 20, 1 denotes a table mounted upon suitable legs 2 and upon which the transverse creaser is mounted and works, said table standing in line with and connected to a supporting frame or structure, Figs. 2, 4, 6 and 9, hereinafter set forth in detail, which frame carries the longitudinal creasers. The various creasing and blank stops or arresting devices are all operated from a common source of power, to wit a band pulley 3 secured to the driving shaft 4 of the machine. Said shaft, see Figs. 3 and 7, finds its support in bearings 5 and 6 secured respectively to the vertically disposed side frames or columns 7 and 8.

Figures 1, 20:
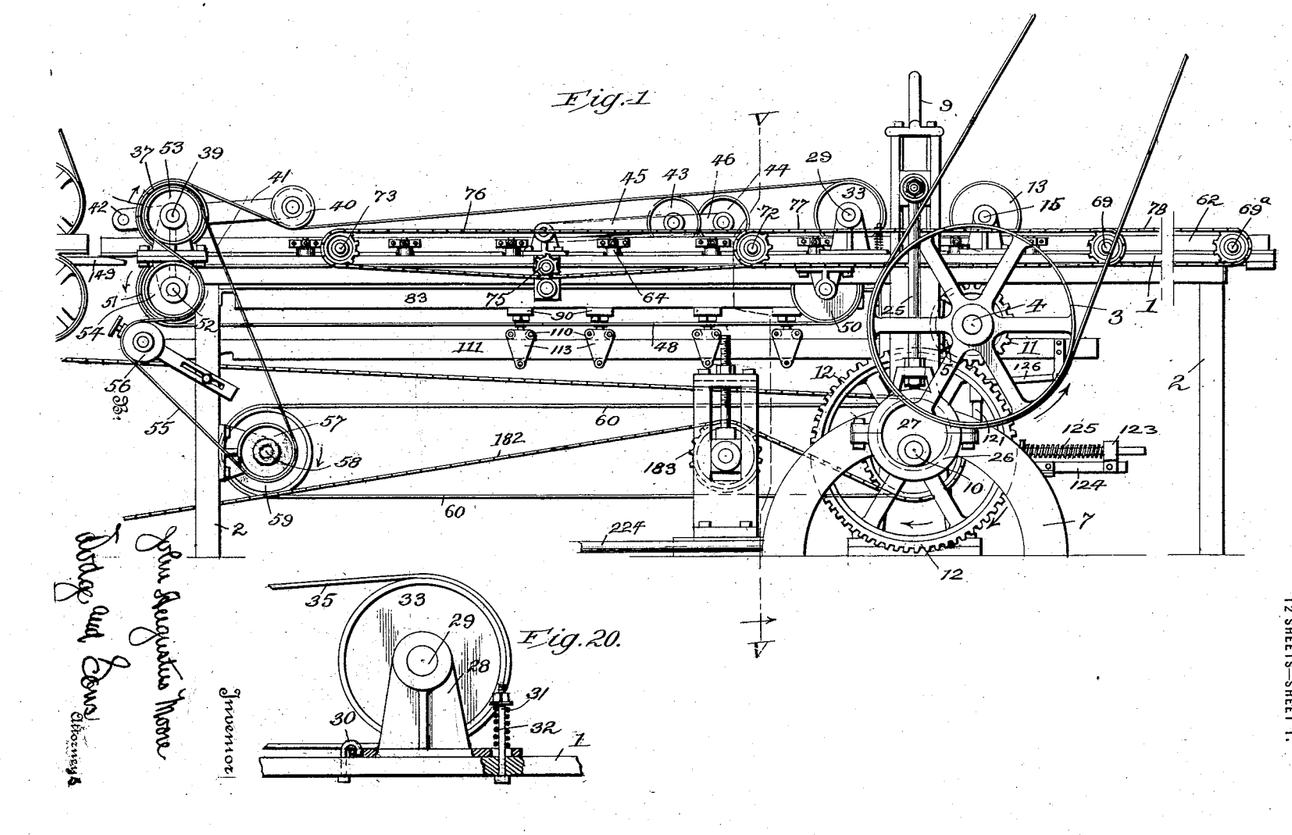
Figure 1 is a side elevation of the forward portion of the machine.
Fig. 20, Sheet 1, a detail view of the mounting of one of the conveyer belt supporting pulleys.
Figure 5:
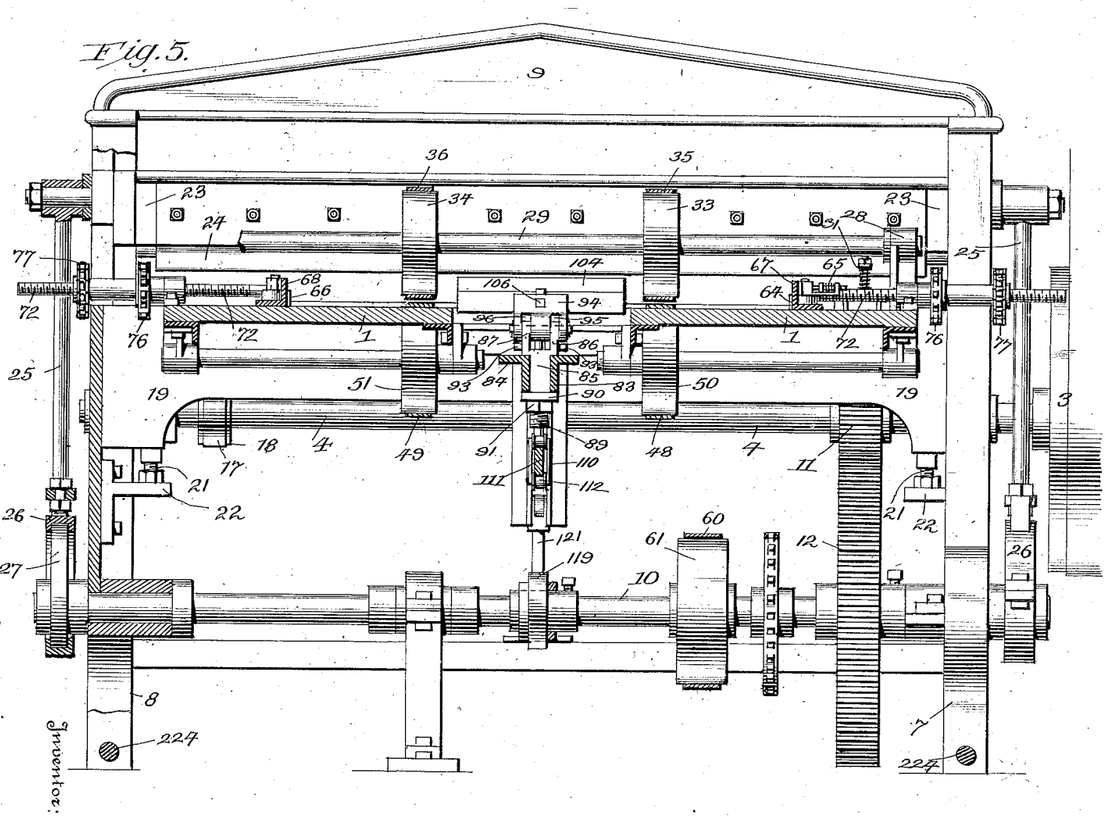
Fig. 5 a transverse vertical sectional view on the line V—V of Fig. 1.
Figure 6:
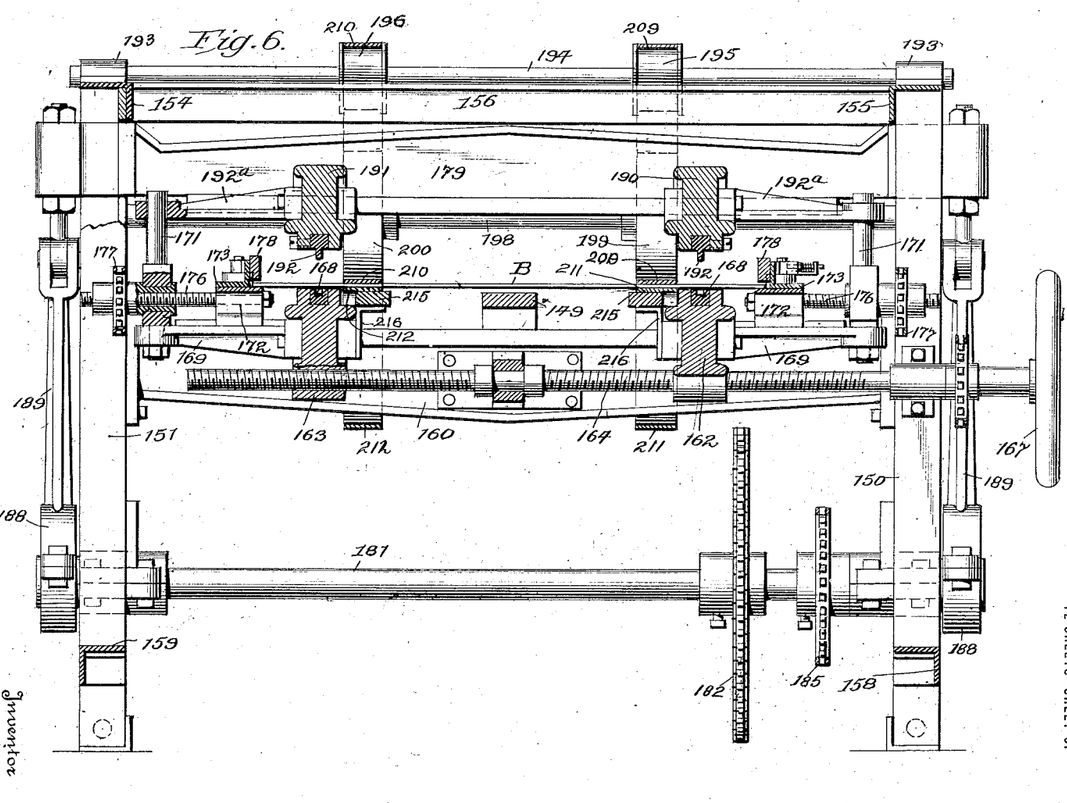
Fig. 6 a similar view on the line VI—VI of Fig. 2.
Figure 7:
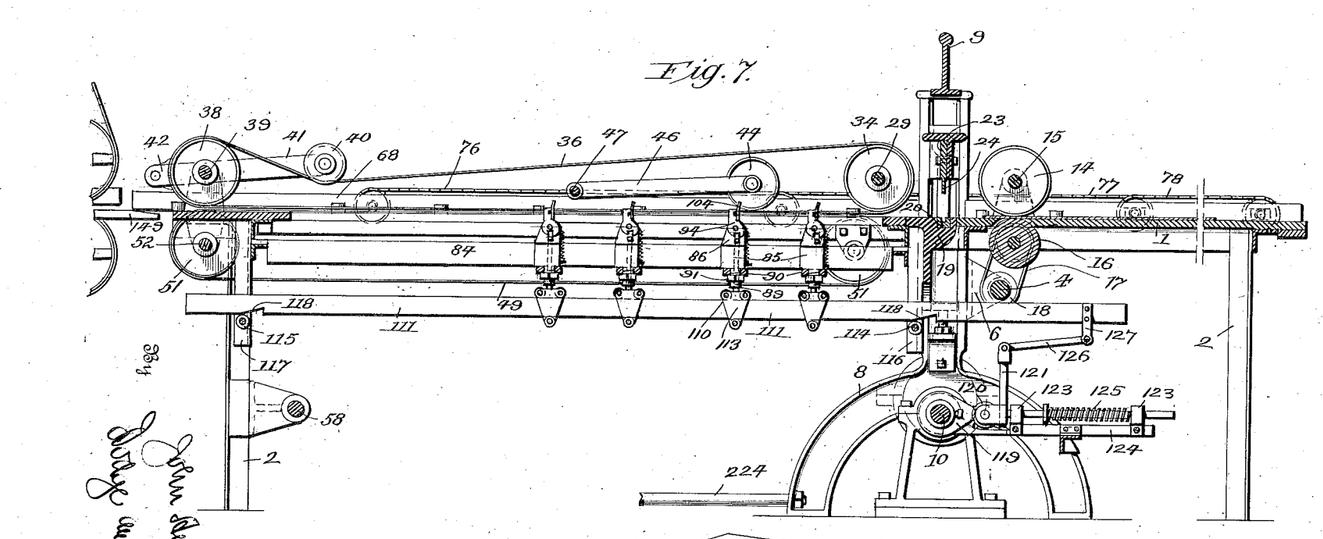
Fig. 7 a longitudinal vertical sectional view on the line VII—VII of Fig. 3.
Figure 19:
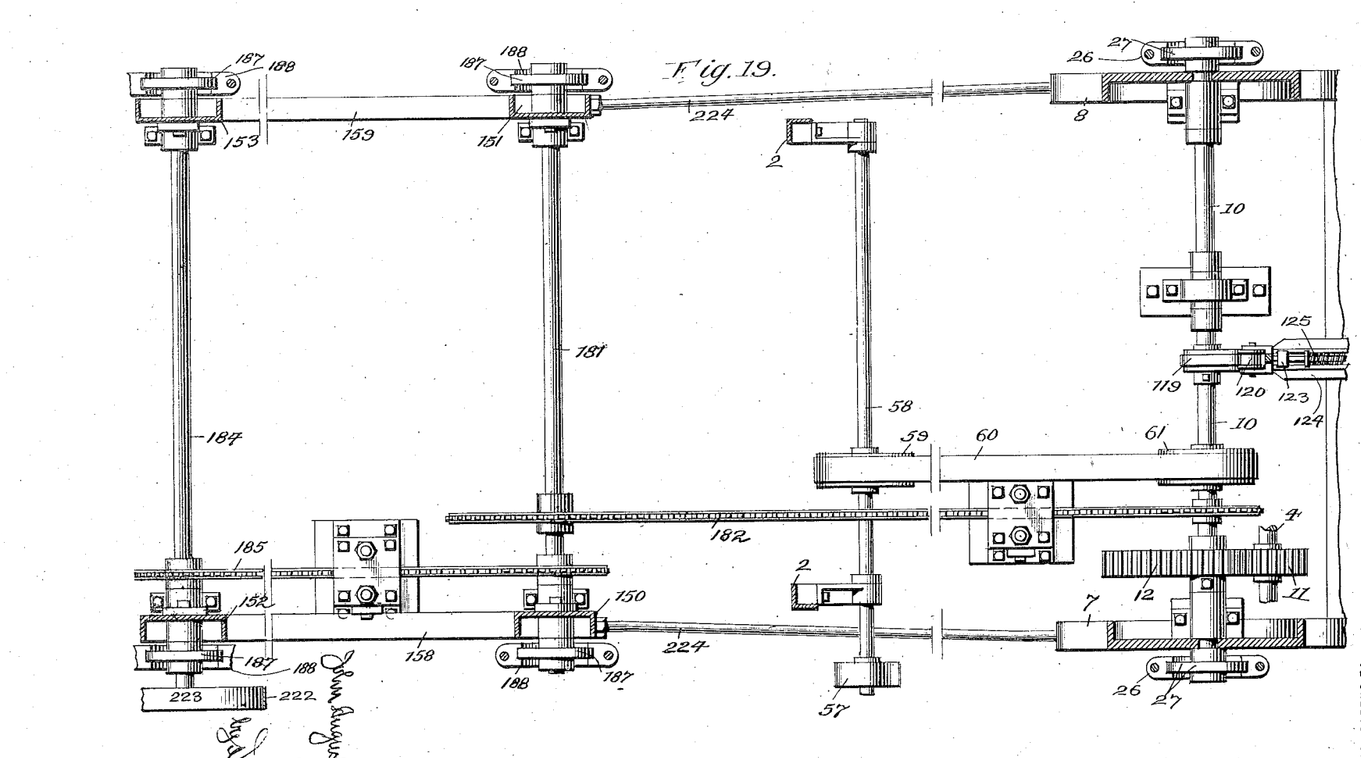
Fig. 19 a sectional plan showing the various power driven and driving shafts.

Said columns as will be noted are made quite substantial and are tied together at their upper ends by a cross beam 9, Figs. 1, 5 and 7. A counter shaft 10, Figs. 5 and 19 is located below a pinion 11 secured upon shaft 4 and a gear 12 carried by shaft 10 meshes therewith.

Figure 11:
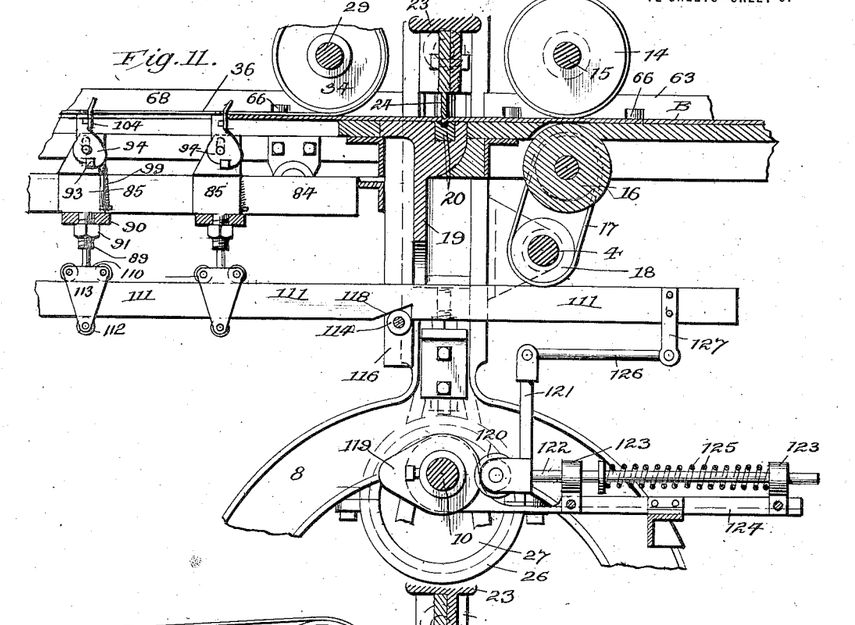
Fig. 11 an enlarged detail vertical sectional view illustrative of the cross indenter, the stops, and the actuating mechanism for the parts.
Figure 12:
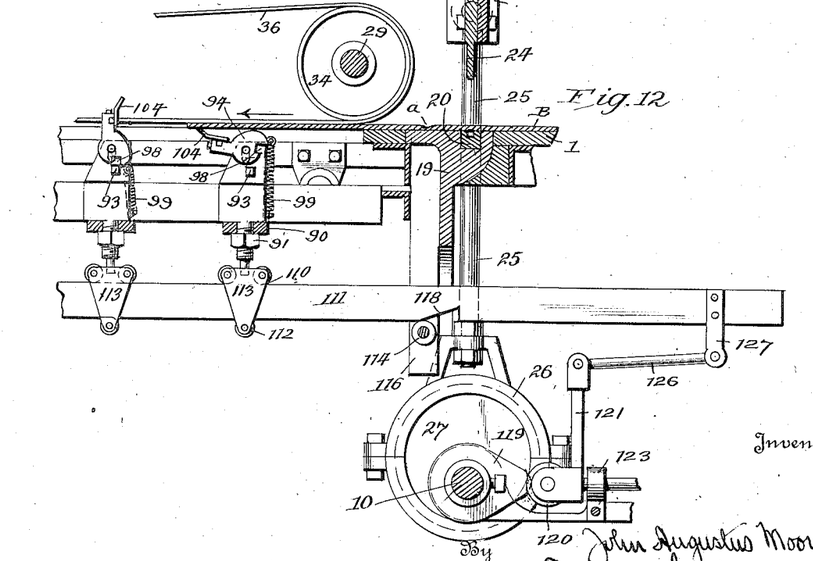
Fig. 12 a like view with the indenter raised and the first stop thrown to inoperative position.

The blanks from which the boxes are to be formed are denoted by B and are designed to be fed into the machine one at a time, the blanks being placed upon the forward end of the table 1 and being fed forwardly by and between two pulleys or wheels 13 and 14, preferably provided with a friction face, and mounted on a shaft 15, and an underlying roller 16, see Figs. 7 and 11. Said roller is driven by a belt 17, Fig. 7, which passes about a pulley 18 secured upon shaft 4. The blanks thus introduced pass over and onto a cross beam 19 into the upper face of which is set a bar 20 having a longitudinally disposed groove or recess formed in its upper face and forming what may be termed the die plate. Said beam, see Fig. 5 is adjustably mounted between the columns 7 and 8, its vertical position being determined by adjusting bolts 21, bearing on fixed brackets 22.

Mounted and movable in vertical ways formed in the upper ends of columns 7 and 8 is a cross head 23 made sufficiently heavy so as not to spring and secured to and extending downwardly therefrom is a creaser bar 24 which stands in alinement with the underlying die plate or bar 20 and with which it coacts to crease the blank.

Said cross head 23 is raised and lowered through the action of pitmen 25 connected to the ends thereof and attached at their lower ends to straps 26 coöperating with eccentrics 27 secured to the outer ends of counter shaft 10.

The blank as it leaves the creaser passes over the stop devices, presently to be described, and between feed devices which carry it forward, said devices in the present instance taking the form of belts, best shown in Figs. 1, 3, 5 and 7. Mounted on table 1 adjacent the creaser mechanism are brackets 28 in which is journaled a shaft 29. Said brackets, see more particularly Fig. 20, are pivotally connected at one side by hooks 30 to the table 1, and a spring 31 held by bolt 32 bears upon the other side thereof and tends to hold the bracket down to the table.

A pair of pulleys 33 and 34 is mounted on the shaft and belts 35 and 36 pass respectively about said pulleys and likewise about pulleys 37 and 38 fixed to a shaft 39 mounted at the opposite end of the table.

Figures 3, 25:
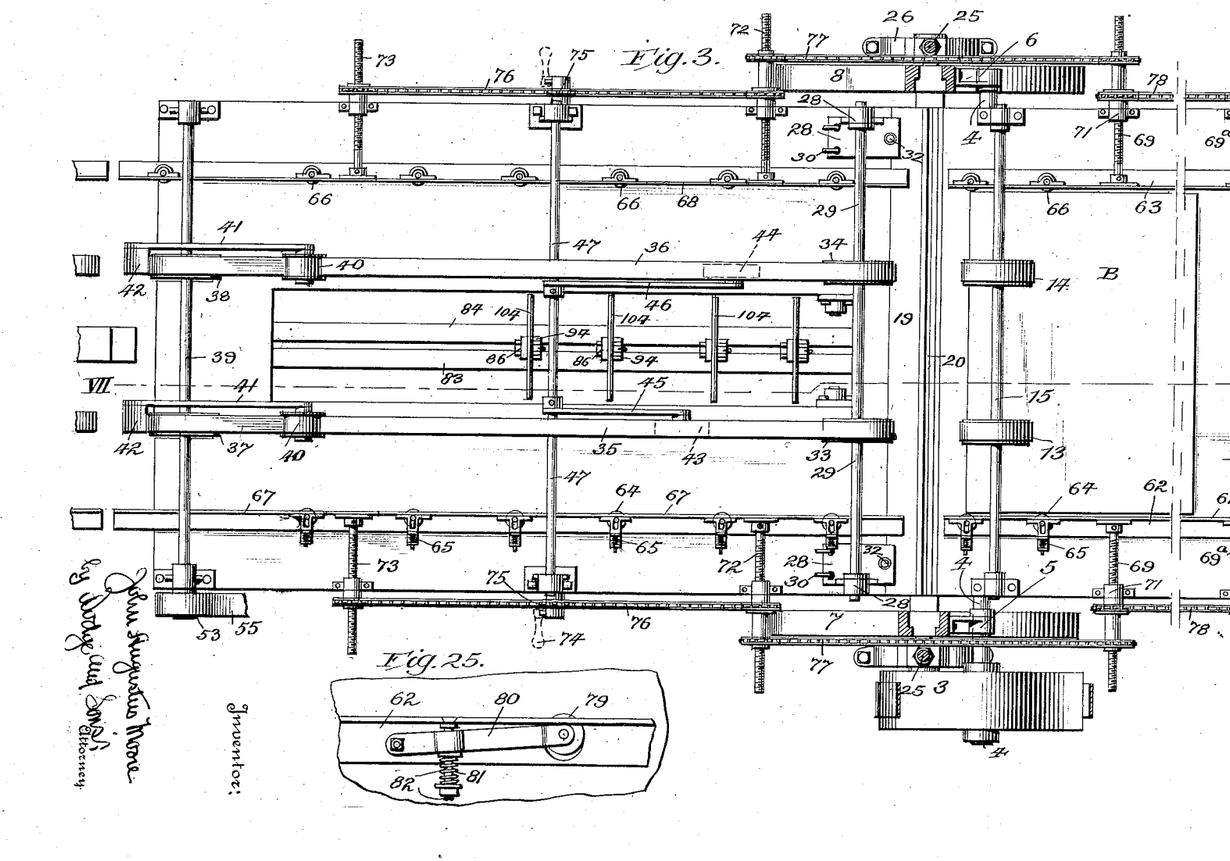
Fig. 3 a top plan view partly in section of the forward end of the machine.
Fig. 25, Sheet 3, a detail view of a modified form of edge guide for the blank.

An idler pulley 40, one for each belt 35, 36, see Figs. 1 and 3, carried at the forward end of a lever 41 pivoted on shaft 39, bears on the belts, and a shoe 42 carried at the rear of the lever and contacting with the belt serves to throw the forward end of the lever and the pulley 40 downwardly and place the belt under stress. This means and the spring support for pulley shaft 29 tends to hold the under run on the belt taut and straight.

Other idlers 43 and 44 bearing upon the upper or inner face of the lower run, may also be employed which have the effect of holding the belt in place and against upward movement as the stock is advanced against the stops located adjacent thereto. Said idlers are supported on levers 45, 46 secured to a cross shaft 47, see Fig. 3.

Coacting with belts 35 and 36 respectively and arranged below the same is a second pair of belts 48 and 49, the upper run whereof overlies the table 1, see Fig. 5, directly below the lower run of the upper belts. Said belts 48 and 49 at the head end of the machine pass respectively over pulleys 50 and 51 and at the opposite end over pulleys, Figs. 1 and 7, secured to shaft 52. A pulley 53 is secured to shaft 39 and a pulley 54 is secured to shaft 52, said pulleys standing in alinement. A belt 55, see Fig. 1 passes in reverse direction around said pulleys 53 and 54, over an idler 56 and about a driven pulley 57, said latter pulley, see Fig. 19, being secured upon a shaft 58. Shaft 58 carries a pulley 59 and a belt 60 passing thereabout and a pulley 61 on shaft 10 imparts motion to shaft 58 and consequently to shafts 39 and 52 through the belting above set forth.

It will thus be seen that the feed belts 35 and 36 and 48 and 49 are constantly driven and that the lower stretch of the former and the upper stretch of the latter move in the same direction and tending at all times to carry the blanks forward.

To guide the blanks as they pass forwardly and to provide for blanks of different size the following mechanism is provided.

Resting on the table 1 forward of the creasing mechanism are oppositely disposed parallel bars 62 and 63 the bars being preferably L-shaped in cross section.

Bar 62 is provided with a plurality of rollers 64 arranged on vertical axes, and pressed forward by springs, as 65 so that normally the periphery of the roller extends inwardly beyond the inner face of the bar. Bar 63 carries a plurality of rollers 66 the bearings of the axes of which are fixed.

To the left of the indenter mechanism guide bars or rails 67 and 68 are provided, said rails being of the same form as the bars or rails 62 and 63 and being in alinement therewith. Rollers as 64 and 66 are likewise provided for bars 67 and 68.

Threaded rods 69 and 69ᵃ are rotatably mounted at their inner ends in bearings 70 attached to guide 62 the rods being threaded through fixed nuts 71 secured to table 1.

Similar rods 72 and 73 are likewise secured to guide rail 67. Simultaneous inward or outward adjustment of both rails 62 and 67 is effected through the manipulation of a crank 74 which actuates a sprocket wheel 75 which meshes with a sprocket chain 76 which passes about sprockets secured on rods 72 and 73. Motion is imparted from rod 72 through a chain 77 to rod 69 and from 69 to 69ᵃ through a chain 78.

A similar arrangement is provided for the adjustment of rails or bars 63 and 68. From this it will be seen that the guide rails may be shifted laterally as desired to accommodate the same to blanks of different size, or to shift them all in one direction to bring the stock or blanks into the desired relation to the longitudinal creasers, hereinafter described.

In Fig. 25 a modification of the guide roll mounting is shown wherein the roller 79 is carried by a lever 80 fulcrumed on the rail 62 and pressed inwardly by a spring 81 encircling a fixed stem 82 which passes through the lever.

Figure 8:
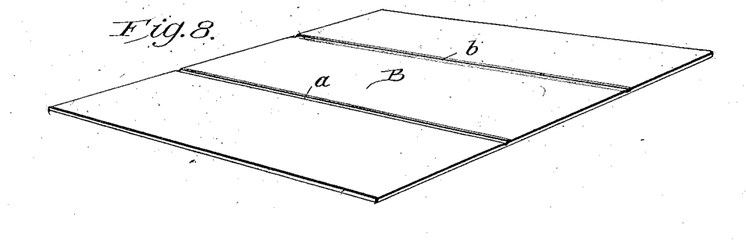
Fig. 8 a perspective view of a partially scored blank.

It is of course necessary that the stock or blanks be at rest when the creaser bar descends to produce the crease, and it is also essential that the blank may be stopped at various points to permit the formation of a plurality of transverse creases as $a$ and $b$, Fig. 8. To this end a series of stop elements standing in the path of travel of the blank are employed, said elements being adjustable as to distance toward and from the creaser and also working in consonance therewith so that the stops will be locked in effective position when the creaser bar descends and be free to be moved by the stock while the bar is elevated.

One embodiment of the stop mechanism is illustrated in Figs. 3, 5 and 7 and 11 to 18 inclusive. As will be seen upon reference to Figs. 3 and 5 the central portion of the table intermediate the feed belts is cut away and extending lengthwise of the table beneath said opening are two inverted L shaped supporting bars 83 and 84 along which the stops are adjustably secured. The stops are alike in form and operation, hence a description of one will suffice. A block or casting 85 extends between the bars, said block having two laterally spaced arms or cheek plates 86 and 87 extending upwardly therefrom, the arms being offset from the body forming shoulders 88 which rest upon the upper faces of the bars, see Fig. 14. A hollow threaded stem 89 extends downwardly from the block and a washer 90 and nut 91 placed thereon serve when the nut is tightened up to draw the shoulders down into binding relation with the bars.

Each cheek plate 86, 87 is provided adjacent its upper portion with an elongated slot or opening 92 and likewise, below said slots, with an outwardly extending locking lug 93 for the swinging stop. A head block or casing 94 provided in its lower portion with two slots 95, 96 adapted to embrace the cheek plates 86 and 87 is held in position with reference to said plates by a pivot pin 97 which extends through the block and through the elongated openings 92 and by such mounting the head block 94 may have a rising and falling motion as well as a swinging movement about the pin. Said block at its lower portion and at each side is provided with a notch 98 adapted when the block is lowered and in its vertical position to embrace the lugs 93 and to thus lock the block against swinging movement. A spring 99 secured at its lower end to a pin 100 extending outwardly from block 85 and at its upper end to a link 101 pivotally connected to the forward lower portion of the head block 94 tends to draw the head block downwardly and forwardly and to maintain it in its locked position.

Figures 13, 14, 15, 16, 17, 18:
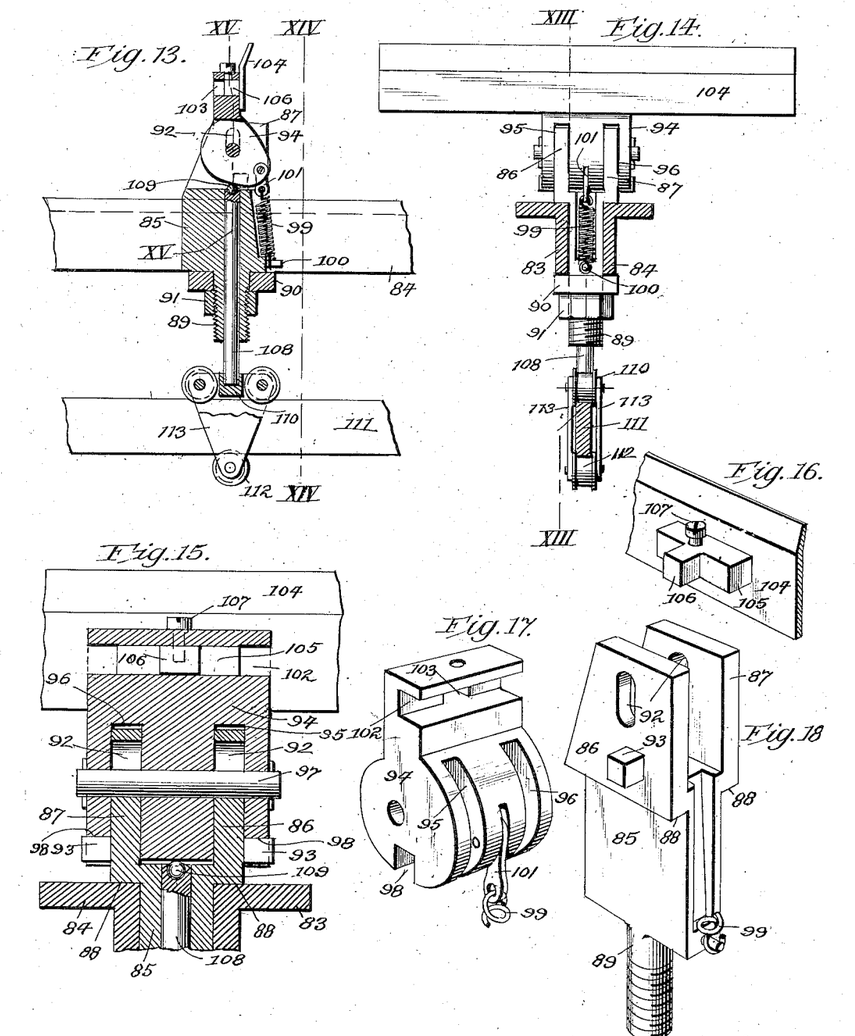
Fig. 13 a vertical sectional view on the line XIII—XIII of Fig. 14, illustrating one of the stops for the blanks.
Fig. 14 a like view on the line XIV—XIV of Fig. 13.
Fig. 15 a similar view of the upper portion of the stop on the line XV—XV of Fig. 13.
Figs. 16, 17 and 18 perspective views of component elements of the stop.

The upwardly extending portion of the head block is provided with a cross slot 102 in its forward face and likewise with a rearwardly extending opening 103. A stop plate 104 having a rib 105 and a lug 106, Fig. 16, is secured to the head block, the rib 105 fitting in slot 102 and lug 106 in opening 103, the parts being held in position by a screw 107. Said plate, see Figs. 3 and 5 is of a length slightly less than the width of the opening in the table 1 and projects above the table directly in line with the oncoming blank being fed forward by the feed belts as above set forth. The upper portion of the plate will preferably be given a slightly forward inclination, see Figs. 13 and 16.

The stem 89 as above stated is hollow and the bore is extended upwardly through the block 85 opening between the plates 86 and 87. A rod 108 works in said bore and carries a ball 109, at its upper end which ball at all times bears against the curved under face of the head block, the lower end of the rod takes into a truck 110 the rollers whereof rest upon the upper edge of an actuating bar 111, the truck being held thereon by an under running roller 112 and side plates 113 connected to the pivot pin of said roller and to the truck. Bar 111 extends lengthwise of the machine and rests at its opposite ends upon rollers 114 and 115 mounted in hangers 116, 117, see Figs. 7 and 11. The under face of the bar is provided with two cam faces 118 adapted to coact with the rollers and to raise and lower the bar as it is moved endwise. Said endwise reciprocation is provided for by the mechanism best shown in Figs. 11 and 12. Secured to shaft 10 is a cam 119 said cam coacting with a roll 120 mounted upon the lower end of an arm 121 which is maintained in alinement with and against the cam by a slide rod 122 working in bearings 123 mounted upon a fixed supporting member 124. A spring 125 acts to press the rod forward and to hold roll 120 against the cam. Arm 121 is connected by a link 126 and arm 127 to the actuating bar or slide 111.

When the parts are in the position shown in Figs. 11 and 13, cams 118 ride down on the rollers 114, 115 and the swinging head or block 94 is locked against movement by reason of engagement of the lugs 93 with the recesses 98; consequently the step plate 104 is held rigid and the forward movement of the blank is arrested. At the same time the creaser bar 24 is lowered through the action of the eccentrics 27 and coacting with the die bar or plate 20 creases the blank transversely. As the bar is raised cam 119 moves the bar 111 to the right through roller 120, rod 121, link 126 and arm 127, causes cams 118 to raise the bar and through rod 108 to raise head 94 disengaging the same from lugs 93 and allowing the blank to rock the same rearwardly against the tension of spring 99. The blank or stock then moves forward until it contacts the next stop where its movement is again arrested preparatory to the descent of the creaser bar, the bar 111 having meanwhile been lowered by reason of the cam 119 having passed out of contact with roller 120 and permitting spring 125 to come into action to move the bar 111 endwise to the left, Fig. 11. The lowering of the bar permits the swinging heads 94 to again assume their locked position. The speed of the feed belts will be such as to advance the blank from one arrested position to another before the creaser bar again descends.

By adjusting the stops along their support any distance required between adjacent creases may be had, and any number of creases may be produced. Where two creases as shown in Fig. 8 are made only two stops are necessary, the other two illustrated in the drawings being removed or at least the plates 104 are demounted.

Figure 21:
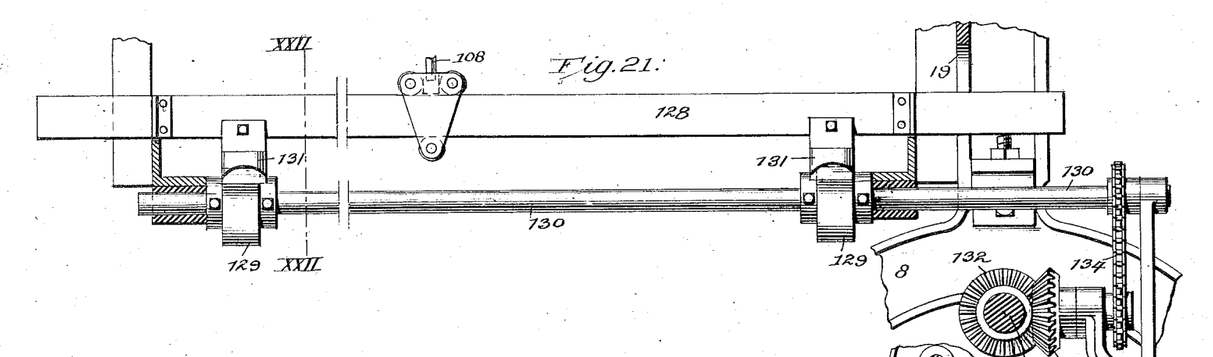
Fig. 21 a sectional elevation of a portion of the machine showing a modified form of stop actuating mechanism.
Figures 22, 24:
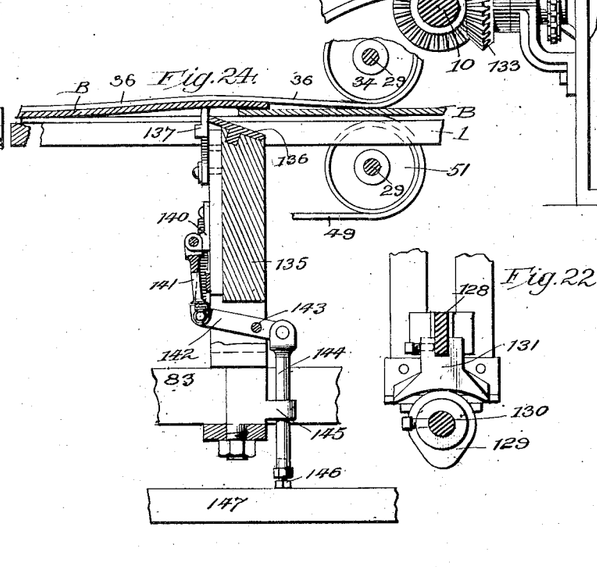
Fig. 22 a detail sectional view on the line XXII—XXII of Fig. 21.
Fig. 24 a central vertical sectional view thereof.

In Figs. 21 and 22 a modified form of stop actuating mechanism is illustrated. In this instance instead of employing a reciprocating actuating bar to raise the truck and releasing rod, the truck, only one of which is shown, is mounted on a bar 128 which is held against longitudinal movement but which is raised and lowered by cams 129 mounted on a shaft 130, wiper blocks 131 secured to the bar overlying and coacting with said cams. Motion is imparted to said shaft through a beveled gear 132, secured on shaft 10, which gear meshes with a similar gear 133 secured to a short shaft, said shaft carrying a sprocket wheel about which passes a sprocket chain 134. Said chain 134 also engages a sprocket wheel secured upon shaft 130 as clearly indicated in Fig. 21. As will be appreciated the rotation of shaft 130 is continuous and bar 128 is raised through the action of cams 129 and each time it is raised it carries the stop trucks upwardly with it causing rod 108 as above set forth to raise the stop block 94 and release the same so that it may be swung rearwardly by the blank then against it.

Figure 23:
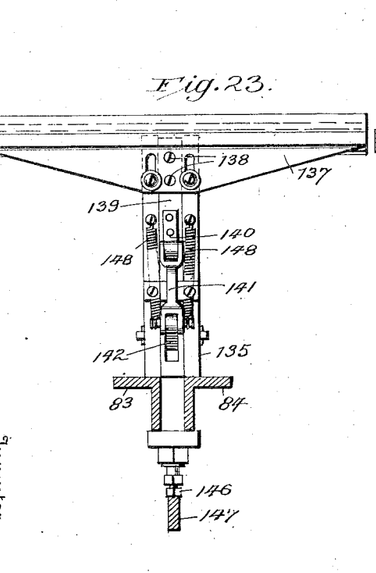
Fig. 23 a face view of the modified form of stop.

In Figs. 23 and 24 a modification of the stop structure is shown whereby the blanks may be fed more expeditiously to the machine and a greater output produced for a given number of revolutions.

The stock or blank feeding belts shown in Fig. 24, are the same in arrangement as above set forth.

Located below the opening in the bed 1 and adjustably supported by the angle bars 83 and 84, is a vertically disposed post 135 the upper end of which carries an inclined plate 136 said plate standing within the opening in the table 1 and its upper portion lying between the upper stretches of the lower pair of feed belts.

The stop plate is denoted by 137 and is secured by screws 138 to the upper end of a slide 139 mounted on the rear face of post 135. A bracket 140 is attached to the slide and a link 141 is pivoted thereto and at its lower end to a lever 142 pivoted at 143 to post 135. A rod 144 guided in a lug 145 is secured to the other end of lever 142 and its lower end, or more specifically an adjusting screw 146 carried thereby, rest upon a lifter bar 147 which may be raised or lowered in a manner similar to bar 111, or similar to bar 128.

A pair of springs 148 fixed at their upper ends to post 135 and at their lower ends to the pivot pin forming the connection between link 141 and lever 142 tend to project the slide 139 and the stop plate upwardly. Such upward movement under the action of the springs may take place while a blank which has been creased and released from the stop is still over the stop, the stop coming against the under face of the blank and raising it and the overlying feed belts upwardly so that the next succeeding blank may pass in beneath the rear end of the retreating blank and finally come against the then upwardly projecting stop plate, the plate 136 guiding the advancing edge of the blank to the stop plate. The belts may be readily raised by the springs it being necessary only to overcome the idlers which maintain the tension on the belt.

The foregoing arrangement does not necessitate the clearance of the creased stock or blank upon the stop nearest the creaser before a new blank may be introduced, hence no strokes of the indenter are lost as is the case with the stop construction first described.

Figure 4:
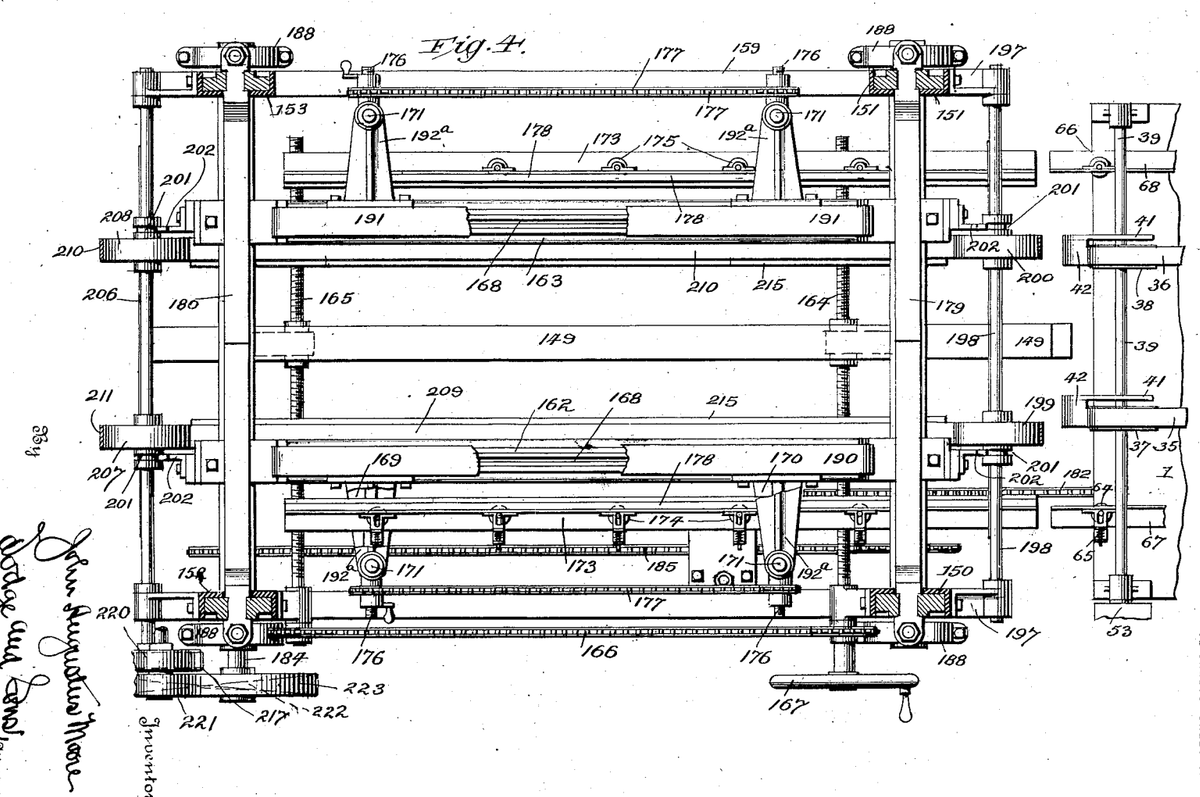
Fig. 4 a similar view of the rear portion.
Figures 9, 10:
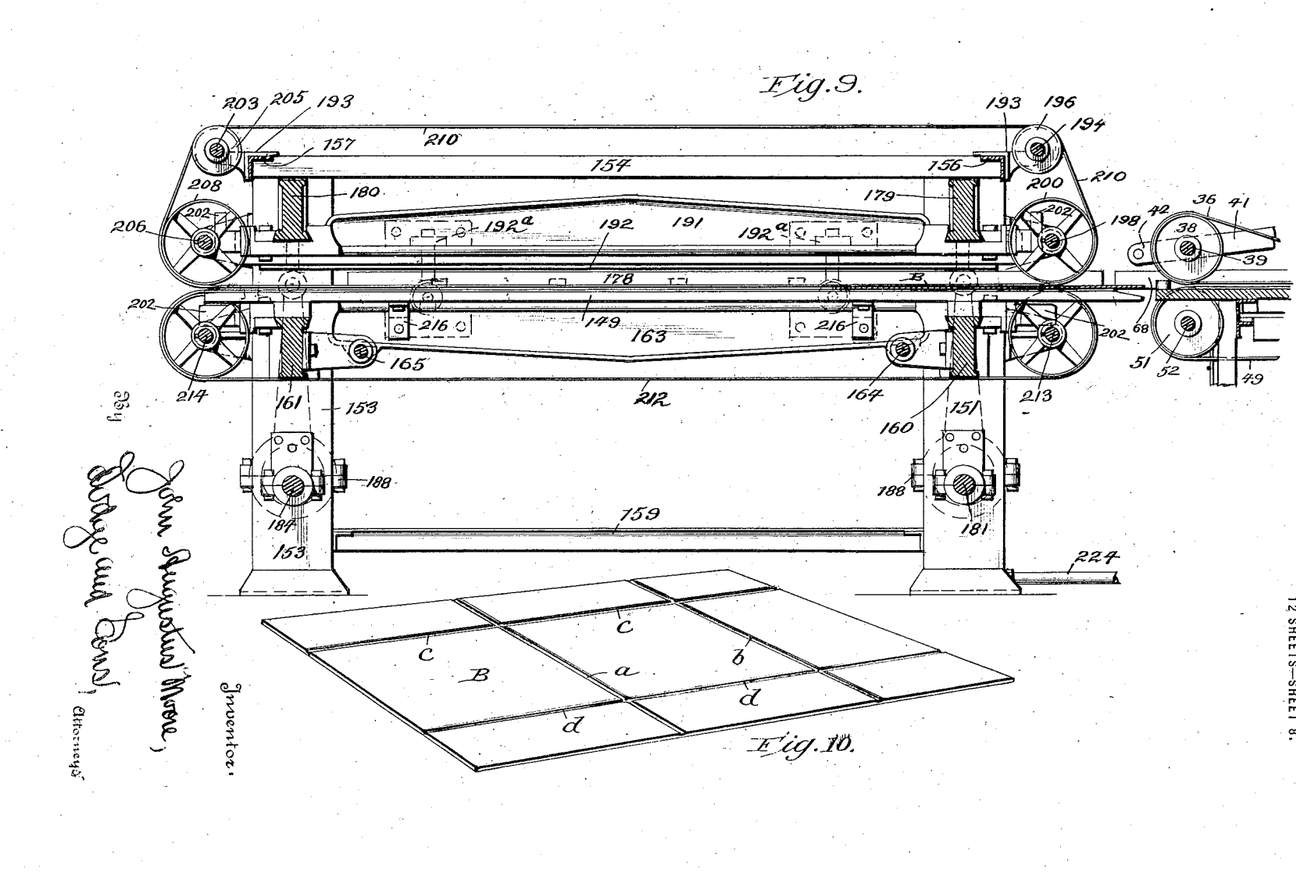
Fig. 9 a longitudinal vertical sectional view taken through the center of the machine.
Fig. 10 a perspective view of the fully scored blank.

The blanks after having been transversely creased pass from the feed belts onto a guide bar 149 which extends lengthwise of the frame on which the longitudinal creasers are mounted, see Fig. 4, said bar preventing the blanks from sagging at the center. Said frame may be said to comprise four vertical posts or columns 150, 151, 152 and 153 tied together at the upper portion by longitudinal rails or braces 154 and 155 and by cross braces 156 and 157. At or near the base of the columns longitudinal braces 158 and 159 are employed. Extending between and secured to the forward columns 150, 151 is a relatively heavy cross beam 160, Figs. 6 and 9 and a similar beam 161, Fig. 9 is secured between the rear pair of columns. The upper faces of said beams are dovetailed to form supporting ways for a pair of longitudinally extending beams 162 and 163 which beams stand parallel to each other. Said beams 162, 163 are adjustable toward and from each other through the agency of lead screws 164, 165 which are actuated in unison by a sprocket chain 166, a hand wheel 167 being mounted on the extended end of one of said screws for the purpose of manipulation.

In the upper face of each of the beams 162, 163 is mounted a die plate 168.

Secured to and extending outwardly from the side of beam 162 are brackets 169, 170 and projecting upwardly of each of the brackets is a guide post 171. Similar brackets and guide posts are secured to beam 163 and are similarly lettered.

A block 172 is mounted on guide ribs or ways formed on each of the brackets 169, said blocks having mounted thereon guide rails 173, said rails carrying rollers 174, 175, similar to guide rollers 64 and 66 above set forth.

The blocks on each side of the machine are adjustable in and out by lead screws 176 which are connected in pairs by the sprocket chains 177. Longitudinally disposed bars 178 are secured to the guide rails 173 and are slightly elevated from the upper face of blocks 172 and between which the edges of the blank pass and by which the edges are prevented from turning up when the creasing die descends. Thus it will be seen that the beams 162, 163 and the die blocks or plates 168 may be moved in and out and that the guides for the edges of the blank can be shifted as may be necessary.

A heavy cross beam 179 is mounted to slide up and down in the upper portion of columns 150 and 151, and a similar beam 180 is similarly mounted in columns 152 and 153. A shaft 181 finds its bearings in columns 150, 151 and is driven from shaft 10, see Fig. 19 by a sprocket chain 182, said chain, see Fig. 1, passing over a take up or tensioning sprocket 183.

A shaft 184 is mounted in columns 152, 153 and derives its motion from shaft 181 through a sprocket chain 185 which also passes over a tensioning sprocket 186.

Shafts 181 and 184 are thus driven in unison and to the outer ends of each there is secured an eccentric 187 to the strap 188 of which is secured a pitman 189. Said pitmen in turn are connected to the ends of the cross beams 179, 180 and as a consequence said beams are continuously raised and lowered in unison.

Attached to the lower faces of beams 179, 180 by suitable dovetail connections is a pair of longitudinally disposed beams 190, 191 each carrying a creaser blade 192 which blades overlie the die plates or bars 168. Attached to and extending laterally from each of the beams 190, 191 is a pair of arms 192$^a$ and in the outer end of each is formed an opening to receive the posts 171. Through this connection beams 190, 191 will be moved toward or from each other as the beams 162, 163 are adjusted and as a consequence the creaser blades are always kept in alinement with the underlying die bars or plates.

To effect the feed of the blanks beneath the creaser blades suitable belts are provided and operate in pairs.

Secured to the upper part of columns 150, 151 are brackets 193 in which is journaled a shaft 194 and loosely mounted thereon are pulleys 195, 196.

A second pair of brackets 197 is secured to the columns and support a shaft 198 upon which are splined pulleys 199 and 200, Fig. 4. As will be seen upon reference to said figure the hubs of the pulleys are each provided with an annular groove 201 into which take guide fingers 202 extending outwardly from the ends of beams 190 and 191.

A shaft 203 is located at the upper ends of columns 152, 153 and carries a pair of pulleys 204 and 205.

A shaft 206 is located below shaft 203 and carries a pair of pulleys 207, 208 which are guided along their shaft in the same manner as pulleys 199 and 200. A belt 209 passes about pulleys 195, 199, 207 and 204 and a belt 210 passes about the corresponding pulleys on the opposite side of the machine.

A second pair of endless belts 211 and 212 pass about pulleys mounted and guided on shafts 213 and 214, the upper runs of said belts passing over and resting upon longitudinally extending supports 215 mounted upon brackets 216 secured to beams 162 and 163. Thus the belts 209 and 211 work in conjunction as do the belts 210 and 212, to feed the stock forward as it is received from the feed belts 35 and 48 and 36 and 49.

Figure 2:
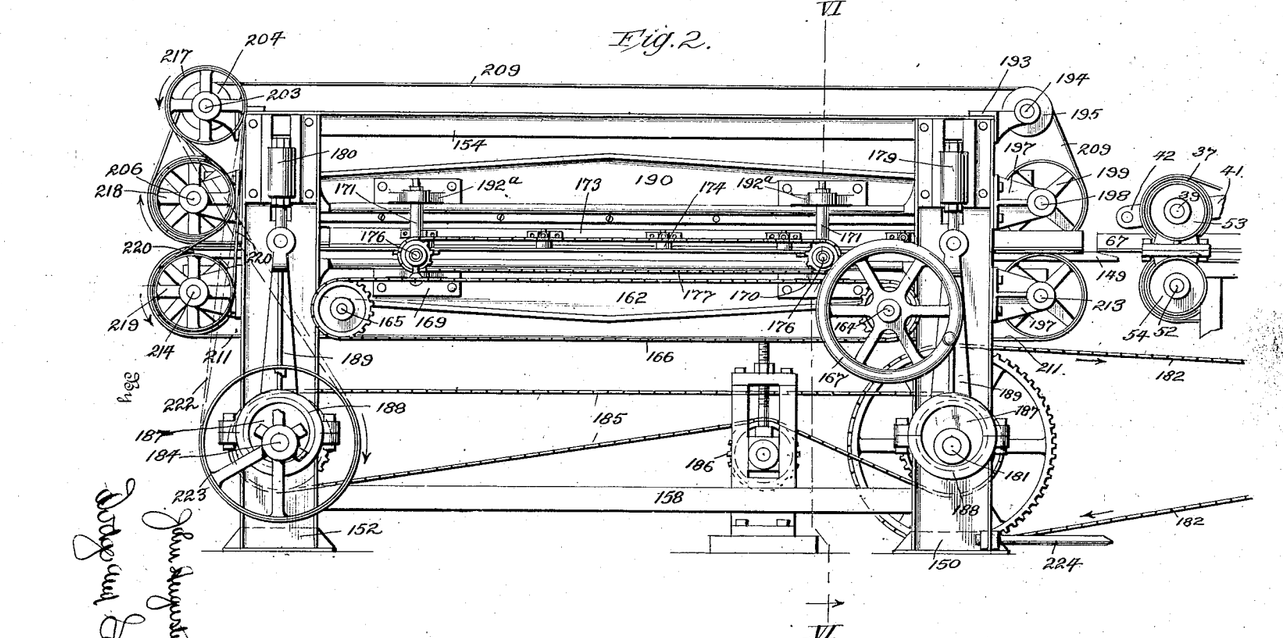
Fig. 2 a like view of the other end, the two views being intended to be read together to disclose the structure, the two views being made upon such a scale as to render the drawing readable.

To impart motion to the belts 209, 210, 211 and 212 driving pulleys 217, 218 and 219 are secured respectively to shafts 203, 206 and 214 and a belt 220 passes about the same in the manner shown in Fig. 2. Shaft 203, Figs. 2 and 4 also has secured to it a pulley 221 and a crossed belt 222 passes thereabout and about a band or belt wheel 223 secured to shaft 184 which latter as above noted is driven through chain 185.

From the foregoing it will be noted that the feed belts 209 and 211, and 210 and 212 are constantly moved and feed the blanks between the longitudinally disposed creaser blades 192 and the underlying die members 168.

It will also be appreciated from the foregoing description that the blades 192 will descend a number of times upon the blanks as they pass beneath the same, but such successive contacts with the stock is not detrimental and is always in the same lines as indicated by c and d, Fig. 10.

Suitable stays or tension rods 224 preferably extend from columns 7 and 8 to the vertical columns 150 and 151, see Fig. 19.

While the machine has been described in more or less detail it will be readily appreciated that the structure in so far as the generic invention is concerned may be modified in many respects.

Having thus described my invention, what I claim is:

1. In a machine for creasing blanks, the combination of continuously acting feeding means for the blanks; a plurality of stops extending upwardly into the normal path of travel of the blanks and adjustable as to location in said path; means for simultaneously raising and lowering said stops; and creasing means adapted to act upon a blank while the same is successively arrested by said stops.

2. In a machine of the character specified the combination of a creasing device; means for feeding the blanks beneath the same; a series of stops arranged in the path of travel of the blanks; means for normally holding the stops in their active position; and actuating means common to all the stops for periodically rendering the same inoperative to permit the forward feed of the blank past the same.

3. In a machine of the character specified, the combination of a creasing device; constantly acting means for feeding the blanks to be creased beneath the same; a series of stops arranged in the path of travel of the blanks to arrest the same at predetermined intervals; means for raising and lowering said stops; and means coöperating with each stop to permit the blank to be advanced thereover after said stop has effected its arresting movement.

4. In a machine of the character specified, the combination of a creasing device; constantly acting feeding means for the blanks to be creased; a plurality of stops located beyond the creaser and movable into and out of the path of travel and from below the same; and means working in timed relation with the creaser for withdrawing the stops into an inoperative position with reference to the blanks.

5. In a machine of the character specified, the combination of a creasing device; constantly operating belts for feeding the blanks being creased; a series of stops extending upwardly between the belts to arrest the blanks while the creaser is operating; means for temporarily withdrawing said stops upon the completion of a creasing action; and an upwardly inclined deflecting member located in advance of each stop.

6. In a machine of the character specified, the combination of a creasing device; constantly operating feed belts, said belts being arranged in opposed pairs between the adjacent runs of which the blanks are grasped and fed forward; a stop device extending upwardly from below the normal path of movement of the blank; a spring urging said stop upwardly into the path of movement of the blanks; and means for periodically and positively lowering the stop.

7. In a machine of the character specified, the combination of a creasing device; constantly operating feed belts; a fixed member having an inclined upper face, said face lying in the path of travel of the blanks; a vertically movable stop member; a spring acting to hold the stop member elevated; and means for lowering the stop member.

8. In a machine of the character specified, the combination of a table; a creasing device; edge guides for the blanks to be creased mounted on the table; means for adjusting said guides toward and from each other; a constantly acting feed mechanism for the blanks; a plurality of stops located in the path of movement of the blanks; and means for periodically rendering said stops inoperative.

9. In a machine of the character specified, the combination of means for creasing a blank crosswise; a pair of creasers for simultaneously creasing the blank lengthwise; and means for adjusting said last named creasing means transversely of the blank toward and from each other whereby the position of the lengthwise creases on the blank may be made at the desired position.

10. In a machine of the character specified, the combination of means for creasing a blank crosswise at intervals throughout its length; a plurality of simultaneously acting creasing devices arranged to crease the blank lengthwise; and means for adjusting said last named creasing devices laterally.

11. In a machine of the character specified, the combination of a plurality of die plates arranged in line with the feed of the blanks; a creaser blade arranged above each die plate; feed belts for the blanks; and means for simultaneously shifting said die plates, blades and belts.

12. In a machine of the character specified, the combination of a plurality of die plates arranged lengthwise of the feed of the blanks; means for adjusting the same toward and from each other; supporting brackets extending outwardly from each die plate; a pair of cross beams; a pair of creaser blades supported thereby; a pair of brackets extending out from each of said blades; a post extending up from each of the lowermost brackets and passing through the corresponding upper bracket; a pair of feed belts located adjacent each creasing die and blade; and connections for shifting said belts with the die and blades.

13. In a machine of the character specified, the combination of means for creasing a blank crosswise; a plurality of die plates arranged in line with the feed of the blanks; a creaser blade arranged above each die plate; feed belts for the blanks; and means for simultaneously shifting said die plates, blades and belts.

14. In a machine of the character specified, the combination of a creasing device; constantly operating feed belts, said belts being arranged in opposed pairs between the adjacent runs of which the blanks are grasped and fed forward; a plurality of stop devices extending upwardly from below the normal path of movement of the stock; a spring for each stop serving to move it into the plane of travel of the stock; and an actuating bar common to all of said stops for lowering the same.

In testimony whereof I have signed my name to this specification.

JOHN AUGUSTUS MOORE.